(12) United States Patent
Ohzuku et al.

(10) Patent No.: US 7,935,443 B2
(45) Date of Patent: May 3, 2011

(54) LITHIUM NICKEL-MANGANESE-COBALT OXIDE POSITIVE ELECTRODE ACTIVE MATERIAL

(75) Inventors: Tsutomu Ohzuku, Nara (JP); Hiroshi Yoshizawa, Hirakata (JP); Masatoshi Nagayama, Hirakata (JP)

(73) Assignee: Panasonic Corporation, Osaka (JP)

( * ) Notice: Subject to any disclaimer, the term of this patent is extended or adjusted under 35 U.S.C. 154(b) by 400 days.

(21) Appl. No.: 10/362,944

(22) PCT Filed: Apr. 15, 2002

(86) PCT No.: PCT/JP02/03741
§ 371 (c)(1),
(2), (4) Date: Feb. 27, 2003

(87) PCT Pub. No.: WO03/003487
PCT Pub. Date: Jan. 9, 2003

(65) Prior Publication Data
US 2005/0079416 A1 Apr. 14, 2005

(30) Foreign Application Priority Data
Jun. 27, 2001 (JP) .................................. 2001-195353

(51) Int. Cl.
*H01M 4/50* (2010.01)
*H01M 4/52* (2010.01)

(52) U.S. Cl. ............... 429/231.3; 429/223; 429/224; 429/231.1

(58) Field of Classification Search ............... 429/218.1, 429/221, 223, 224, 231.1, 231.3
See application file for complete search history.

(56) References Cited

U.S. PATENT DOCUMENTS

| | | | |
|---|---|---|---|
| 5,160,712 A | 11/1992 | Thackeray et al. |
| 5,264,201 A | 11/1993 | Dahn et al. |
| 5,370,948 A | 12/1994 | Hasegawa et al. |
| 5,393,622 A | 2/1995 | Nitta et al. |
| 5,626,635 A | 5/1997 | Yamaura et al. |
| 5,629,110 A | 5/1997 | Kobayashi et al. |
| 5,677,087 A | 10/1997 | Amine et al. |
| 5,738,957 A | 4/1998 | Amine et al. |
| 5,866,279 A | 2/1999 | Wada et al. |
| 5,981,106 A | 11/1999 | Amine et al. |

(Continued)

FOREIGN PATENT DOCUMENTS

EP 0 554 906 A1 8/1993

(Continued)

OTHER PUBLICATIONS

Atsushi Ueda et al., "Solid-State Redox Reactions of LiNi$_{frax;1;2}$Co$_{frax;1;2}$O$_2$ (R3m) for 4 Volt Secondary Lithium Cells", J. Electrochem. Soc., vol. 141, No. 8, Aug. 1994, pp. 2010-2014.

(Continued)

*Primary Examiner* — Tracy Dove
(74) *Attorney, Agent, or Firm* — McDermott Will & Emery LLP (57) ABSTRACT

A nonaqueous electrolytic secondary cell produced at low cost and having a large capacity comprises a negative electrode having an active material mainly composed of a material that at least absorbs and releases lithium ions or metallic lithium, a positive electrode, and an electrolyte. The active material of the positive electrode is an oxide containing nickel, manganese, and cobalt, and the contents of the elements are substantial the same.

4 Claims, 5 Drawing Sheets

U.S. PATENT DOCUMENTS

| | | | |
|---|---|---|---|
| 5,985,237 | A | 11/1999 | Lu et al. |
| 6,045,771 | A | 4/2000 | Matsubara et al. |
| 6,168,887 | B1 | 1/2001 | Dahn et al. |
| 6,241,959 | B1 | 6/2001 | Cho et al. |
| 6,291,107 | B1 | 9/2001 | Shimizu et al. |
| 6,352,794 | B1 | 3/2002 | Nakanishi et al. |
| 6,416,902 | B1 * | 7/2002 | Miyasaka ............. 429/223 |
| 6,436,577 | B1 | 8/2002 | Kida et al. |
| 6,551,744 | B1 | 4/2003 | Ohzuku et al. |
| 6,582,854 | B1 | 6/2003 | Qi et al. |
| 6,660,432 | B2 * | 12/2003 | Paulsen et al. ......... 429/231.3 |
| 6,753,111 | B2 | 6/2004 | Kweon et al. |
| 6,773,852 | B2 | 8/2004 | Cho et al. |
| 6,808,848 | B2 | 10/2004 | Nakanishi et al. |
| 6,964,828 | B2 | 11/2005 | Lu et al. |
| 7,029,793 | B2 | 4/2006 | Nakagawa et al. |
| 7,078,128 | B2 | 7/2006 | Lu et al. |
| 2001/0024754 | A1 | 9/2001 | Fukuzawa et al. |
| 2002/0009645 | A1 | 1/2002 | Shima et al. |
| 2002/0197532 | A1 | 12/2002 | Thackeray et al. |
| 2003/0054251 | A1 | 3/2003 | Ohzuku et al. |
| 2003/0082448 | A1 | 5/2003 | Cho et al. |
| 2003/0082452 | A1 | 5/2003 | Ueda et al. |
| 2003/0087154 | A1 | 5/2003 | Ohzuku et al. |
| 2003/0129496 | A1 | 7/2003 | Kasai et al. |
| 2003/0165737 | A1 | 9/2003 | Nakagawa et al. |
| 2003/0170540 | A1 | 9/2003 | Ohzuku et al. |
| 2004/0058243 | A1 | 3/2004 | Ohzuku et al. |
| 2004/0110063 | A1 | 6/2004 | Uchitomi et al. |
| 2004/0126660 | A1 | 7/2004 | Ohzuku et al. |
| 2005/0027156 | A1 | 2/2005 | Pulido et al. |
| 2005/0079416 | A1 | 4/2005 | Ohzuku et al. |
| 2005/0147889 | A1 | 7/2005 | Ohzuku et al. |
| 2005/0260496 | A1 | 11/2005 | Ueda et al. |
| 2006/0099508 | A1 | 5/2006 | Thackeray et al. |
| 2006/0204847 | A1 | 9/2006 | Ohzuku et al. |
| 2007/0009424 | A1 | 1/2007 | Ohzuku et al. |

FOREIGN PATENT DOCUMENTS

| | | |
|---|---|---|
| EP | 0 630 054 | 12/1994 |
| EP | 0 989 622 A1 | 3/2000 |
| EP | 1 026 765 | 8/2000 |
| EP | 1 073 136 | 1/2001 |
| EP | 1 295 851 A1 | 3/2003 |
| EP | 1 309 022 A2 | 5/2003 |
| JP | 63-121258 | 5/1988 |
| JP | 3244314 | 10/1991 |
| JP | 4-267053 | 9/1992 |
| JP | 05-242891 | 9/1993 |
| JP | 05-283076 | 10/1993 |
| JP | 06-072708 | 3/1994 |
| JP | 6-96768 | 4/1994 |
| JP | 08-171910 A | 12/1994 |
| JP | 7-37576 | 2/1995 |
| JP | 08-138670 A | 5/1996 |
| JP | 8-171910 | 7/1996 |
| JP | 8-213015 | 8/1996 |
| JP | 08-217452 | 8/1996 |
| JP | 08213015 A * | 8/1996 |
| JP | 2547992 | 10/1996 |
| JP | 09-055210 | 2/1997 |
| JP | 9-129229 A | 5/1997 |
| JP | 09-129230 | 5/1997 |
| JP | 9-129230 | 5/1997 |
| JP | 09-129230 A | 5/1997 |
| JP | 09-232002 | 9/1997 |
| JP | 10-3921 | 1/1998 |
| JP | 10-069910 | 3/1998 |
| JP | 10-69910 | 3/1998 |
| JP | 10-194745 | 7/1998 |
| JP | 10-199525 | 7/1998 |
| JP | 10-265225 | 10/1998 |
| JP | 10-310433 | 11/1998 |
| JP | 10-316431 A | 12/1998 |
| JP | 11-1323 A | 1/1999 |
| JP | 11-025980 | 1/1999 |
| JP | 11001323 | 1/1999 |
| JP | 11-060246 A | 3/1999 |
| JP | 11071115 | 3/1999 |
| JP | 11-167919 | 6/1999 |
| JP | 11-310416 | 9/1999 |
| JP | 11-292547 | 10/1999 |
| JP | 11-307094 | 11/1999 |
| JP | 11-339802 | 12/1999 |
| JP | 2000-77071 A | 3/2000 |
| JP | 2000-082466 | 3/2000 |
| JP | 2000-133262 | 5/2000 |
| JP | 2000-149923 | 5/2000 |
| JP | 2000149942 | 5/2000 |
| JP | 2000-182618 A | 6/2000 |
| JP | 2000-195514 A | 7/2000 |
| JP | 2000-223122 A | 8/2000 |
| JP | 2000-251892 | 9/2000 |
| JP | 2000-268874 | 9/2000 |
| JP | 2000-323123 A | 11/2000 |
| JP | 2000-340230 | 12/2000 |
| JP | 2001-23640 A | 1/2001 |
| JP | 2001-035495 A | 2/2001 |
| JP | 2001-085006 | 3/2001 |
| JP | 2001-143702 | 5/2001 |
| JP | 2001-185145 A | 7/2001 |
| JP | 2001-185153 | 7/2001 |
| JP | 2001-192210 | 7/2001 |
| JP | 2001-202959 A | 7/2001 |
| JP | 2001-243952 | 9/2001 |
| JP | 2001-319688 | 11/2001 |
| JP | 2001-332261 | 11/2001 |
| JP | 3244314 | 1/2002 |
| JP | 2002-42813 | 2/2002 |
| JP | 2002-042889 | 2/2002 |
| JP | 2002-110231 | 4/2002 |
| JP | 2002-145623 | 5/2002 |
| JP | 2002-158011 | 5/2002 |
| JP | 2002-289194 | 10/2002 |
| JP | 2002-304993 A | 10/2002 |
| JP | 2002-338250 | 11/2002 |
| JP | 2003-059490 | 2/2003 |
| JP | 2003-137555 | 5/2003 |
| JP | 2003-221236 | 8/2003 |
| JP | 2003-238165 | 8/2003 |
| JP | 2004-002141 | 1/2004 |
| JP | 2002-100358 | 4/2005 |
| KR | 2002-0019221 | 3/2002 |
| KR | 2000-0017619 | 3/2003 |
| WO | WO 98/57386 A1 | 7/1996 |
| WO | WO 01/99215 A1 | 12/2001 |
| WO | WO 02/40404 | 5/2002 |
| WO | WO 03/015198 A2 | 2/2003 |

OTHER PUBLICATIONS

Ohzuku, T. et al., "Electrochemistry amd Structural Chemistry of $LiNiO_2$ (R3m) for 4 Volt Secondary Lithium Cells" J. Electrochem. Soc., Jul. 1993, vol. 140, No. 7 pp. 1862-1870.

Spahr, M. et al. "Characterization of Layered Lithium Nickel Manganese Oxides Synthesized by a Novel Oxidative Coprecipitation Method and Their Electrochemical Performance as Lithium Insertion Electrode Materials" J. Electrochem. Soc., Apr. 1998, vol. 145, No. 4, pp. 1113-1120.

Kanno, R. et al., "Structure and Physical Properties in Cathode Materials for Lithium Secondary cells -Lithium Nickel Oxides and Lithium Manganese Oxides" Department of Chemistry, Faculty Science, Kobe University, announced on Dec. 7, 1998, pp. 85-95.(Partial translation attached).

Arai, H. et al., "Electrochemical and Thermal Behavior of $LiNi_{1-z}M_zO_2$ (M = Co, Mn, Ti)" J. Electrochem. Soc., Sep. 1997, vol. 144, No. 9, pp. 3117-3125.

B.J. Neudecker et al., "Lithium Mangnese Nickel Oxides $Li_x(Mn_yNi_{1-y})_{2-x}O_2$", J. Electrochem. Soc., vol. 145, No. 12, Dec. 1998, pp. 4148-4159.

E. Rossen et al., "Structure and electrochemistry of $Li_xMn_yNi_{1-y}O_2$", Solid State Ionics 57(1992) pp. 311-318.

Ohzuku et el. Chemistry Letters, vol. 30 (2001), No. 7, pp. 642-443.

Ohzuku et al. Chemistry Letters, vol. 30 (2001), No. 8, pp. 744-745.

Qiming Zhong et al., "Synthesis and Electrochemistry of LiNi$_x$Mn$_{2-x}$O$_4$", J. Electrochem. Soc., vol. 144, No. 1, Jan. 1997, pp. 205-213.

M.M. Grush et al., "Correlating Electronic Structure with Cycling Performance of Substituted LiMn$_2$O$_4$ Electrode Materials: A Study Using the Techniques of Soft X-ray Absorption and Emission", Chem. Mater, 2000, 12, pp. 659-664.

"Layered Cathode Materials Li[Ni$_x$ Li$_{(frax;1;3-2x/3)}$ Mn$_{(frax;2;3-x/3)}$]O$_2$ for Lithium-Ion Batteries." Zhonghua Lu, et al. *Electrochemical and Solid-State Letters* 4(11) (2001), pp. A191-A194.

"Relationship Between Chemical Bonding Character and Electrochemical Performance in Nickel-Substituted Lithium Manganese Oxides." Hyo-Suk Park, et al. *J. Phys. Chem.* B vol. 105 No. 21 (2001), pp. 4860-4866.

"Synthesis, Structure, and Electrochemical Behavior of Li[Ni$_x$ Li$_{frax;1;3-2x/3}$Mn$_{frax;2;3-x,3}$]O$_2$." Zhonghua Lu, et al. *Journal of the Electrochemical Society* 149(6) (2002) pp. A778-A791.

"Preparation by a '*chimie douce*' route and characterization of LiNi$_z$Mn$_{1-z}$O2 (0.5szs1) Cathode Materials." Daniel Caurant, et al. *J. Mater. Chem.* 6(7) (1996), pp. 1149-1155.

Tabuchi M et al., "Electrochemical and magnetic properties of lithium manganese oxide spinels prepared by oxidation at low temperature of hydrothermally obtained LiMnO2", vol. 89, No. 1-2, Aug. 1, 1996, pp. 53-63, XP004070124.

Search Report dated May 30, 2006.

Lu, Z. et al., Layered Cathode Materials Li[Ni$_x$ Li$_{(frax;1;3-2x/3)}$ Mn$_{(frax;2;3-x/3)}$ ]O$_2$ for Lithium-Ion Batteries, Electrochemical and Solids-Sate Letters, 2001, p. A191-A194, vol. 4, The Electrochemical Society, Inc.

Lu, Z. et al., "Layered Li[Ni$_x$ Co$_{1-2x}$ Mn$_x$ ]O$_2$ Cathode Materials for Lithium-Ion Batteries," Electrochemical and Solid-State Letters, p. A200-A203, vol. 12, The Electrochemical Society, Inc.

Terada, Y. et al., "In Situ XAFS Analysis of Li(Mn, M)$_2$ O$_4$ (M=Cr, Co, Ni) 5V Cathode Materials for Lithium-Ion Secondary Batteries," Journal of Solid Sate Chemistry, Feb. 2001, p. 286-291, vol. 156 Issue 2, Academic Press.

Park, H. et al., "Relationship between Chemical Bonding Character and Electrochemical Performance in Nickel-Substituted Lithium Manganese Oxides," J. Phys. Chem., May 3, 2001, p. 4860-4866, vol. 105, American Chemical Society.

Lu et al., "Superlattice Ordering of Mn, Ni, and Co in Layered Alkali Transition Metal Oxides with P2, P3, and O3 Structures," Chem. Mater, p. 3583-3590, vol. 12, American Chemical Society.

Abraham, et al., "Surface changes on LiNi$_{0.8}$ Co$_{0.2}$ O$_2$ particles during testing of high power lithium-ion cells," Electrochemistry Communications, May 2002, p. 620-625, vol. 4, Elsevier.

West et al., "Introduction for Solid-State Chemistry," Kodansha-Scientific, Mar. 20, 1996, with partial translation.

Yoshio et al., "Lithium-ion Secondary Battery," Nikkan Kogyo Shinbunsha, Mar. 29, 1996, with partial translation.

Saka, K, "Study of Crystal Electron microscope," Uchida Rokakuho, Nov. 25, 1997, with partial translation.

Japanese Society of Microscopy, Kanto Division, "Technique of Electron microscope technique for advanced material evaluation," Asakura-shoten, Dec. 15,1991, with partial translation.

Kato, M., "Analysis of X-ray diffraction," Uchida Rokakuho, Apr. 20, 1990, with partial translation.

Neudecker, B.J. et al., "Lithium Manganese Nickel Oxides Li$_x$(Mn$_y$ Ni$_{1-y}$)$_{2-x}$ O$_2$," J. Electrochem. Soc., Dec. 1998, p. 4148-1459, vol. 145, No. 12, The Electrochemical Society, Inc.

Yoshio, M. et al., "Preparation and properties of LiCo$_y$Mn$_x$Ni$_{1-x-y}$O$_2$ as a chathode for lithium ion batteries," Journal of Power Sources, Aug. 17, 1998, p. 176-181, vol. 90, Elsevier.

Cho, T. et al., "Preparation of Layered Li(Ni$_{frax;1;3}$Mn$_{frax;1;3}$Co$_{frax;1;3}$)O$_2$ as a Cathode for Lithium Secondary Battery by Carbonate Coprecipitation Method," Chemistry Letters, Feb. 24, 2004, p. 704-705, vol. 33 No. 6, The Chemical Society of Japan, Japan.

Ohzuku, T. et al., "Why transition metal (di) oxides are the most attractive materials for batteries," Solid State Ionics, Aug. 1994, p. 202-211, vol. 69 No. 3,4, North-Holland, The Netherlands.

Ohzuku, T. et al., "Synthesis and Characterization of LIAl$_{frax;1;4}$Ni$_{frax;3;4}$O$_2$ (R3m) for Lithium-Ion (Shuttlecock) Batteries," Journal of the Electrochemical Society, Dec. 1995, p. 4033-4039, vol. 142 No. 12, The Electrochemical Society, Inc.

Ohzuku, T. et al.,"New Route to Prepare LiNiO$_2$ For 4-Volts Secondary Lithium Cells," Chemistry Express, vol. 7, No. 9, pp. 689-692, 1992, Kinki Chemical Society, Japan.

Ohzuku, T. et al., "Synthesis and Characterization of LiNiO$_2$, (R3m) For Rechargeable Nonaqueous Cells," Chemistry Express, vol. 6, No. 3, Mar. 1991, pp. 161-164, Kinki Chemical Society, Japan.

Ohzuku, T. et al., "Solid State Electrochemistry of Intercalation Compound of LIAl$_{frax;1;2}$Ni$_{frax;1;2}$O$_2$ (R3m) for Lithium-Ion Batteries," Electrochemisty of Intercalation, (1998), p. 1209-1214, vol. No. 12, The Electrochemical Society of Japan, Japan.

Ohzuku, T. et al., "Comparative Study of LiCoO$_2$ , LiNi$_{frax;1;2}$Co$_{frax;1;2}$O$_2$ and LINIO$_2$ For 4 Volt Secondary Lithium Cells," The Journal of The International Society Of Electrochemisty, Jun. 1993, p. 1159-1167, vol. 38 No. 9, Pergamon Press.

Lu et al "Layered Li{Ni Co—Mn}O2 Cathode Materials For Lithium-Ion Batteries" Electrochemical and Solid-State Letters 4 (12) pp. A200-A203 (2001) The Electrochemical Society Inc. (2001).

United States Office Action issued in U.S. Appl. No. 10/277,989 dated on Jun. 27, 2008.

United States Office Action issued in U.S. Appl. No. 10/629,815 dated on Jul. 10, 2008.

Japanese Office Action issued in Japanese Patent Application No. JP 2001-196353 dated on Aug. 28, 2008.

European Search Report issued in European Patent Application No. EP 4256668.7-1227 dated on Aug. 6, 2008.

United States Office Action issued in U.S. Appl. No. 10/277,989 dated Feb. 25, 2009.

United States Office Action issued in U.S. Appl. No. 10/629,815 dated May 26, 2010.

United States Office Action issued in U.S. Appl. No. 10/629,815 dated Jul. 23, 2009.

United States Office Action issued in U.S. Appl. No. 11/797,130 dated Jul. 21, 2009.

A. Ueda et al., "Solid-State Redox Reactions of LiNi$_{frax;1;2}$Co$_{frax;1;2}$O$_2$ (R3m) for 4 Volt Secondary Lithium Cells," J. Electrochem. Soc. vol. 141, No. 8, Aug. 1994. pp. 2010-2014.

T. Ohzuku et al., "Synthesis and Characterization of LiMeO$_2$ (Me=Ni, Ni/Co and Co) for 4 Volts Secondary Nonaqueous Lithium Cells," Journal of the Ceramic Society of Japan, Mar. 31, 1992, vol. 100 (No. 3), pp. 346-349.

United States Office Action issued in U.S. Appl. No. 12/007,617, mailed Oct. 7, 2009.

United States Office Action issued in U.S. Appl. No. 10/277,989, mailed Jul. 14, 2009.

\* cited by examiner

LITHIUM NICKEL-MANGANESE-COBALT OXIDE POSITIVE ELECTRODE ACTIVE MATERIAL

TECHNICAL FIELD

The present invention relates to a positive electrode active material, particularly to a positive electrode active material for a non-aqueous electrolyte secondary battery. The present invention further relates to a high-capacity and low-cost non-aqueous electrolyte secondary battery having a positive electrode containing a specific positive electrode active material.

BACKGROUND ART

In recent years, with the widespread use of cordless and portable AV appliances, personal computers and the like, the need has been increasing for compact, light weight, and high energy density batteries as power sources for driving those appliances. In particular, lithium secondary batteries, as having high energy density, are expected to be dominant batteries in the next generation, and the potential market thereof is very large.

In most of the lithium secondary batteries currently available on the market, $LiCoO_2$ having a high voltage of 4 V is used as the positive electrode active material, but $LiCoO_2$ is costly because Co is expensive. Under such circumstances, research has been progressing to investigate various positive electrode active materials as substitutes for $LiCoO_2$. Among them, a lithium-containing transition metal oxide has been wholeheartedly researched: $LiNi_aCo_bO_2$ (a+b≈1) is promising, and it seems that $LiMn_2O_4$ having a spinel structure has already been commercialized.

In addition, nickel and manganese as substitute materials for expensive cobalt have also been under vigorous research.

$LiNiO_2$ having a layered structure, for example, is expected to have a large discharge capacity, but the crystal structure of $LiNiO_2$ changes during charging/discharging, causing a great deal of deterioration thereof. In view of this, it is proposed to add to $LiNiO_2$ an element that can stabilize the crystal structure during charging/discharging and thus prevent the deterioration. As the additional element, specifically, there are exemplified cobalt, manganese, titanium and aluminum.

Moreover, prior art examples which use composite oxides of Ni and Mn as the positive electrode active material for lithium secondary batteries will be described: U.S. Pat. No. 5,393,622, for example, proposes a method in which a hydroxide of Ni, a hydroxide of Mn and a hydroxide of Li are dry-mixed together and baked and, after cooling them down to room temperature, the mixture is again heated and baked to obtain an active material having a composition represented by the formula $Li_yNi_{1-x}Mn_xO_2$ where $0 \leq x \leq 0.3$, $0 \leq y \leq 1.3$.

Further, U.S. Pat. No. 5,370,948 proposes a method in which a Li salt, a Ni salt and a Mn salt are mixed together into an aqueous solution, followed by drying and baking, to obtain an active material represented by the formula $LiNi_{1-x}Mn_xO_2$ where $0.005 \leq x \leq 0.45$.

Further, U.S. Pat. No. 5,264,201 proposes a dry synthesis method in which hydroxides or oxides of nickel and manganese and an excess amount of lithium hydroxide are mixed together and baked, and a synthesis method in which an oxides of nickel and manganese or the like are added to a saturated aqueous solution of lithium hydroxide to form a slurry, which is then dried and baked under a reduced pressure, to obtain an active material represented by the formula $Li_xNi_{2-x-y}Mn_yO_2$ where $0.8 \leq x \leq 1.0$, $y \leq 0.2$.

Furthermore, U.S. Pat. No. 5,629,110 proposes a dry mixing synthesis method which uses β-$Ni(OH)_2$ to obtain an active material represented by the formula $LiNi_{1-x}Mn_xO_2$ where $0 < x \leq 0.2$, $y \leq 0.2$.

Japanese Laid-Open Patent Publication No. Hei 8-171910 proposes a method in which manganese and nickel are coprecipitated by adding an alkaline solution into an aqueous solution mixture of manganese and nickel, then lithium hydroxide is added to the aqueous solution mixture and the resulting mixture is baked to obtain an active material represented by the formula $LiNi_xMn_{1-x}O_2$ where $0.7 \leq x \leq 0.95$.

Further, Japanese Laid-Open Patent Publication No. Hei 9-129230 discloses a preferable particulate active material having a composition represented by the formula $LiNi_xM_{1-x}O_2$ where M is at least one of Co, Mn, Cr, Fe, V and Al, $1 > x \geq 0.5$, and shows a material with x=0.15 as the active material containing Ni and Mn.

Further, Japanese Laid-Open Patent Publication No. Hei 10-69910 proposes an active material synthesized by a coprecipitation synthesis method, represented by the formula $Li_{y-x1}Ni_{1-x2}M_xO_2$ where M is Co, Al, Mg, Fe, Mg or Mn, $0 < x_2 \leq 0.5$, $0 \leq x_1 < 0.2$, $x=x_1+x_2$, and $0.9 \leq y \leq 1.3$. This patent publication describes that the discharge capacity is inherently small if M is Mn, and the essential function of the positive electrode active material for a lithium secondary battery intended to achieve a high capacity is dismissed if $x_2$ is more than 0.5. $LiNi_{0.6}Mn_{0.4}O_2$ is exemplified as a material having the highest proportion of Mn.

It should be noted that, although U.S. Pat. No. 5,985,237 shows a production method of $LiMnO_2$ having a layered structure, this is practically a 3 V level active material.

All of the prior art examples disclosed in the above U.S. Patents and Japanese Laid-Open Patent Publications are intended to improve the electrochemical characteristics such as the cycle characteristic of $LiNiO_2$ by adding a trace amount of an element to $LiNiO_2$, while retaining the characteristic properties of $LiNiO_2$. Accordingly, in the active material obtained after the addition, the amount of Ni is always larger than that of Mn, and the preferable proportion is considered to be Ni:Mn=0.8:0.2. As an example of a material having a proportion with a highest amount of Mn, Ni:Mn=0.55:0.45 is disclosed.

However, in any of these prior art examples, it is difficult to obtain a composite oxide having a single-phase crystal structure since $LiNiO_2$ is separated from $LiMnO_2$. This is because $Mn^{2+}$ is likely to be oxidized to $Mn^{3+}$ during coprecipitation, and $Mn^{3+}$ is unlikely to form a homogenous composite oxide with $Ni^{2+}$.

As described above, as a substitute material for the currently commercialized $LiCoO_2$ having a high voltage of 4 V, $LiNiO_2$ and $LiMnO_2$ as high-capacity and low-cost positive electrode active materials having a layered structure like $LiCoO_2$ have been researched and developed.

However, the discharge curve of $LiNiO_2$ is not flat, and the cycle life is short. In addition, the heat resistance is low, and hence the use of this material as the substitute material for $LiCoO_2$ would involve a serious problem. In view of this, improvements have been attempted by adding various elements to $LiNiO_2$, but satisfactory results have not been obtained yet. Further, since a voltage of only 3 V can be obtained with $LiMnO_2$, $LiMn_2O_4$ which does not have a layered structure but has a spinel structure with low-capacity is beginning to be researched.

Namely, required has been a positive electrode active material which has a voltage of 4V, as high as $LiCoO_2$, exhibits a flat discharge curve, and whose capacity is higher and cost is lower than $LiCoO_2$; further required has been a high-capacity non-aqueous electrolyte secondary battery with excellent charge/discharge efficiency, which uses the above positive electrode active material.

As opposed to this, Japanese Patent Application No. 2000-227858 does not propose a technique for improving the inherent characteristics of $LiNiO_2$ or those of $LiMnO_2$ by adding a new element thereto, but proposes a technique for obtaining a nickel manganese composite oxide (positive electrode active material) which represents a new function by dispersing a nickel compound and a manganese compound uniformly at the atomic level to form a solid solution.

That is to say, the prior art examples propose plenty of additional elements, but not technically clarify which elements are specifically preferred, whereas the above application proposes the positive electrode active material which can represent a new function by combining nickel and manganese at about the same ratio.

Based on the fact that it is possible to obtain a nickel manganese composite oxide which represents a new function by dispersing nickel and manganese uniformly at the atomic level to form a solid solution, the present inventors conducted extensive studies on oxides containing a variety of transition metals, the composition and the crystal structures thereof.

Therefore, it is an object of the present invention to provide a positive electrode active material comprising a composite oxide, which represents a further new function, by means of a technique for forming a solid solution by uniformly dispersing three transition metal elements, instead of two transition metal elements, at the atomic level.

DISCLOSURE OF INVENTION

The present invention relates to a positive electrode active material comprising crystal particles of an oxide containing three transition metals, in which the crystal structure of the crystal particles is a layered structure and the arrangement of oxygen atoms constituting the oxide is cubic close-packed structure.

The oxide is preferably represented by the formula (1): $Li[Li_x(A_PB_QC_R)_{1-x}]O_2$, where A, B and C are independently different transition metal elements, and satisfy the following: $0.1 \leq X \leq 0.3$, $0.2 \leq P \leq 0.4$, $0.2 \leq Q \leq 0.4$, and $0.2 \leq R \leq 0.4$.

It is effective that the three transition metals are selected from the group consisting of iron, nickel, cobalt and manganese. Among them, nickel, cobalt and manganese are preferred.

The crystal structure of the oxide is preferably a layered structure belonging to R3m. Additionally, it is effective that the oxide contains three transition metal elements substantially at equal ratio.

It is effective that the positive electrode active material comprises a mixture of the crystal particles of the oxide with a particle size of 0.1 to 2 μm and secondary particles of the crystal particles with a particle size of 2 to 20 μm.

In addition, it is preferred that the lattice volume of the crystal particles does not increase through oxidation. In other words, the lattice volume may be constant or may decrease through oxidation. Further, it is effective that the error range of the ratio of the three elements is within 10 atom %.

The crystal particles of the oxide is preferably doped with a different element at the vicinity of the surface thereof. It is effective that the different element is at least one selected from the group consisting of aluminum, magnesium, calcium, strontium, yttrium and ytterbium.

In this case, it is preferred that the added amount of the different element is 0.05 to 20 atom % of the total amount of the transition metal elements A, B and C.

Moreover, the present invention relates to a non-aqueous electrolyte secondary battery comprising a negative electrode containing, as a negative electrode active material, at least a material capable of absorbing and desorbing lithium ions and/or lithium metal, a positive electrode containing the above-mentioned positive electrode active material, and an electrolyte.

The present invention can provide a non-aqueous electrolyte secondary battery with a high capacity and good charge/discharge efficiency.

BEST MODE FOR CARRYING OUT THE INVENTION

Based on the prior art that can give a positive electrode active material composed of a nickel manganese composite oxide which represents a new function by dispersing nickel and manganese uniformly at the atomic level to form a solid solution, the present inventors have found that the mixing of three transition metal elements represents another function. In terms of composition in particular, it is of importance that three transition metals are incorporated at the atomic level and that the added amount ratio of these transition metals is substantially equal.

With regard to the crystal structure, it is essential that the composite oxide has a layered structure belonging to R3m and that the three transition metal elements are evenly arranged in 3 (a) site to constitute a superlattice of a [√3×√3] R30° (J. Electrochem. Soc., Vol. 141, P2014(1994)). The present invention provides a positive electrode active material which represents a new function by realizing the above.

The present inventors have also found that the doping the vicinity of the surface of the parent material (the above-mentioned crystal particles) with a trace amount of different metal element gives a new function. Even if the different element (dopant) to be added is evenly dispersed within a crystal lattice, no problem arises as long as its amount is very small. However, if the amount of the different element is large, a problem arises. As stated in the above, since what is important is that the three transition metal elements exist evenly in 3 (a) site to form the superlattice, any amount will do as long as the formation of the superlattice is not destroyed. Since the different element functions particularly on the surface of the crystal particles, it is desirable that the concentration of the different element in the vicinity of the surface be high in order to effectively obtain the effect of the different element.

For instance, the doping of the surface of the crystal particles with an aluminum element improves the heat resistance, slightly increases the potential, makes the shape of the charge/discharge curve to be flat. Alternatively, the doping with magnesium increases the electronic conductivity of the crystal particles. It is also possible to reduce or increase the amount of the gas generated by the reaction between the surface of the crystal particles and the electrolyte at high temperatures by using a different kind of element.

In the following, the present invention is described in detail by using the case of employing nickel, manganese and cobalt as the transition metal element, but the use of other transition metal elements also represents a new function of the present invention if the above conditions are satisfied.

(1) Composition and Structure of Positive Electrode Active Material of the Present Invention First of all, the characteristics of the positive electrode active material of the present invention is described from the viewpoint of crystal structure.

Figure 1:
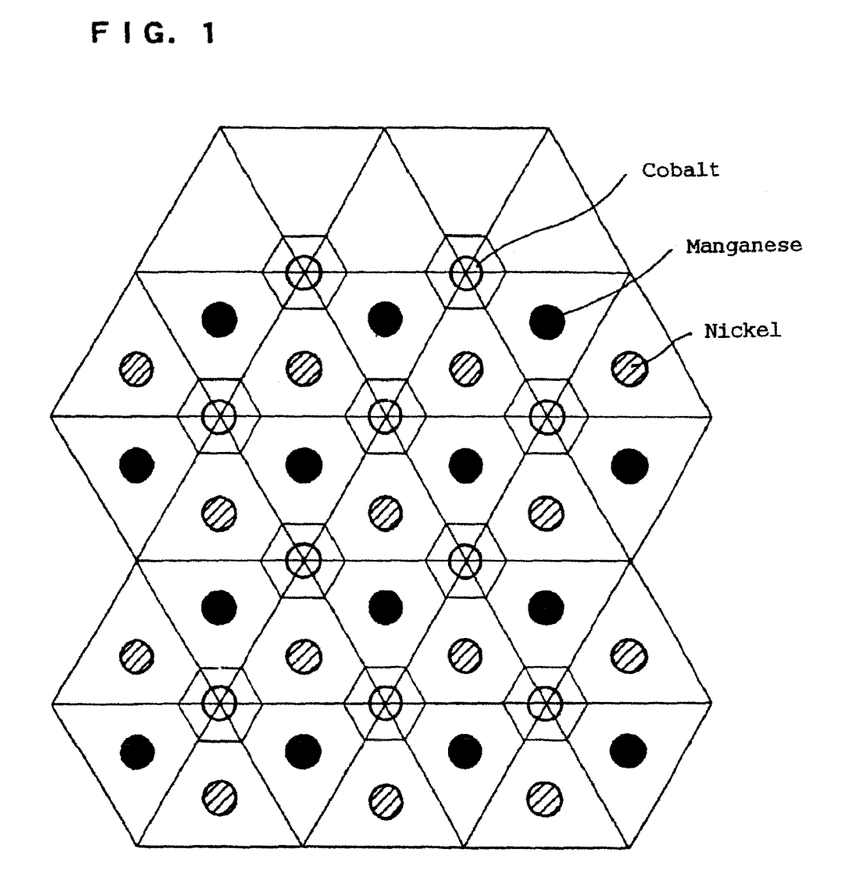
FIG. 1 is a diagram schematically illustrating the arrangement of nickel, manganese and cobalt elements in a crystal particle in accordance with the present invention.

The crystal structure that the crystal particles constituting the positive electrode active material of the present invention have belongs to an α-NaFeO$_2$ type layered structure (R3m). The crystal structures of LiCoO$_2$ and LiNiO$_2$ also belong to a hexagonal crystal system which belongs to the above-mentioned structure. To explain it briefly, a layer constituted by lithium atoms and a layer constituted by the transition metal elements are inserted regularly between the filled oxygen atoms. The transition metal elements are placed in 3(a) site, but, in the oxide of the present invention, three different transition metals are regularly located in this 3(a) site. FIG. 1 is a diagram schematically illustrating that the three transition metal elements (cobalt, nickel and manganese) are regularly arranged in the 3(a) site. The detail explanation of this diagram is disclosed, for instance, in J. Electrochem. Soc., Vol. 141, P2014 (1994).

FIG. 1 indicates that the three transition metal elements are regularly arranged in one plane of a crystal lattice. In addition, the surroundings around each one of the elements (i.e. cobalt, nickel and manganese) are identical. This means that one element is arranged at an equal distance from both the other two elements at the closest point. In other words, the three transition metal elements constitute a superlattice of [√3×√3] R30°. Therefore, it is of importance that the positive electrode active material of the present invention contains three different elements in order to constitute the superlattice.

It is expected that each element causes an electron interaction with each other by forming a superlattice like this, thus representing a new function. The present inventors have found that the use of a combination of cobalt, nickel, manganese and iron represents such effect and that the use of the crystal particles having the superlattice effect as the positive electrode active material for a non-aqueous electrolyte battery significantly improves the characteristics of the battery obtained.

Now, the effect of the crystal particles which constitute the positive electrode active material in accordance with the present invention will be considered with reference to the charge/discharge curves of LiCoO$_2$, LiNiO$_2$ and LiMnO$_2$ which have a layered structure. The potentials of LiCoO$_2$, LiNiO$_2$ and LiMnO$_2$ are 4 V, 3.7 V and 3 V, respectively. Accordingly, when a 4 V level active material having a layered structure is prepared, there has been usually made an attempt to combine Co and Ni and add a trace amount of a third element in order to stabilize the crystal structure while maintaining the potential characteristics of these elements.

U.S. Pat. No. 5,264,201 discloses an active material having a composition represented by the formula: Li$_x$Ni$_{2-x-y}$M$_y$O$_2$ where $0.8 \leq x \leq 1.0$, $y \leq 0.2$, and $y<0.5$ in the case of M being Co. As the added element M, Co, Fe, Ti, Mn, Cr and V are disclosed. As is apparent from this prior art example, many examples of the added element M are shown based on Ni, and the amount of the added element M is very small. Accordingly, this patent publication does not disclose or suggest to add the added element while maintaining the potential characteristics of Ni as discussed above and to control the potential by the combination of the added element. It describes that the added amount of Co is large, but since the ideas that Co has a high potential and that the potential of Co is as same as that of Ni are conventionally known, it is surmised that the combination like this has been examined. Moreover, Japanese Laid-Open Patent Publication No. Hei 4-267053 discloses an active material having a composition represented by the formula: Li$_x$M$_y$N$_z$O$_z$ where M is Fe, Co, Ni, and N is Ti, V, Cr and Mn, and describes that a voltage of 4 V is achieved by the element M and that the structure is stabilized by the element N.

The idea of this prior art example clearly differs from that of the present invention described above. In the present invention, a new function is represented by mixing three elements at almost equal ratio to form the superlattice. Based on this idea, the present inventors conducted extensive studies; as a result, they have found that the use of three elements selected from the group consisting of cobalt, nickel, manganese and iron represents a new function. In fact, the crystal particles of the oxide of the present invention had an unexpectedly higher potential than an oxide containing any one of these elements, and its charge/discharge curves were more flat. This high potential and the flatness of the charge/discharge curves are preferred as the positive electrode active material for a 4 V level non-aqueous electrolyte battery; it is possible to remarkably improve the performance of the battery obtained.

(2) Method for Producing Positive Electrode Active Material of the Present Invention A highly-developed production method is required in order to form the superlattice by mixing three elements at the atomic level as the present invention describes. First, a well-known method for producing a positive electrode active material is the dry mixing-and-baking method. Three oxides or hydroxides containing a transition metal, and lithium hydroxide or lithium carbonate as a lithium source are mixed in this method. The obtained mixture is baked at a proper baking temperature, usually at 800 to 1000° C. However, this method is unlikely to give a single phase structure and to ensure the regular arrangement of elements at the atomic level. Insofar as a X-ray diffraction pattern is concerned, for instance, the particles with a particle size of about 0.3 μm or less have a single phase structure, but the particles with a particle size of greater than about 0.3 μm are unlikely to have a single phase structure. Therefore, it is preferred to use the following wet coprecipitation method in order to obtain a positive electrode active material of the present invention.

For instance, the method for coprecipitating nickel and manganese is disclosed in Japanese Laid-Open Patent Publication No. Hei 8-171910, and is described in detail in the specification of Japanese Patent Application No. 2000-227858. This coprecipitation method gives a composite oxide by simultaneously precipitating mainly two elements by means of a neutralization reaction in an aqueous solution.

In the case of coprecipitating nickel, cobalt and manganese, however, manganese is oxidized into trivalent manganese ion even by a trace amount of oxygen dissolved in an aqueous solution because manganese is very easily oxidized. Accordingly, it is difficult to ensure the incorporating manganese into the composite oxide at the atomic level. When these elements are coprecipitated in the form of hydroxide, Mn$_2$O$_3$ is contained therein because dried hydroxide has a low crystallinity.

In order to solve the above problems, it is preferred in the present invention, for example, to remove the dissolved oxygen by introducing (bubbling) nitrogen or argon, both of which are inert gases, in the aqueous solution, or to add a reducing agent into the aqueous solution in advance.

Figure 2:
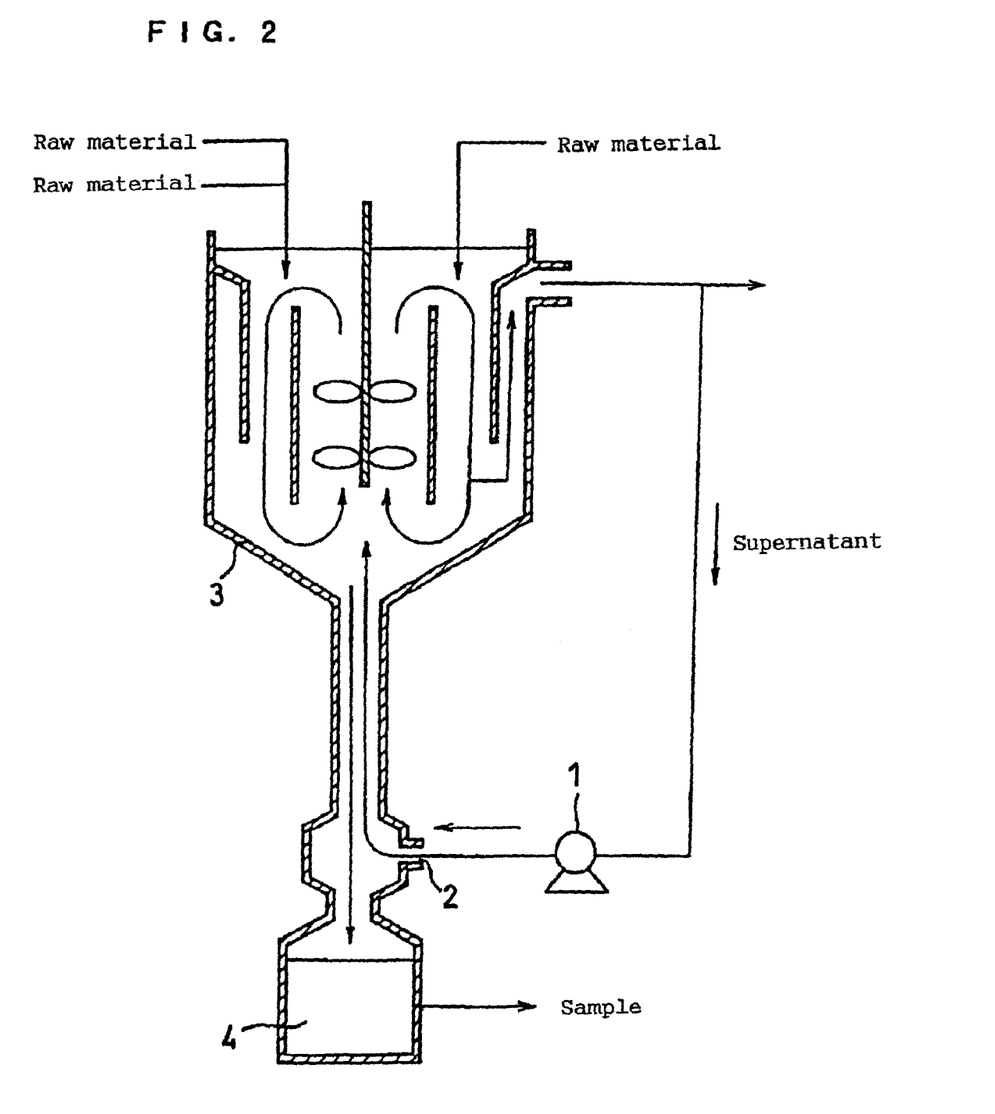
FIG. 2 is a schematic view of experimental equipment used for producing a positive electrode active material by a coprecipitation method in the present invention.

Therefore, the difference between the coprecipitation method of the present invention and the conventional coprecipitation method is that it is performed in an inert atmosphere. In order to obtain a higher-density composite oxide in spherical form with a larger particle size, the following operation is preferably performed using the equipment shown in FIG. 2. FIG. 2 is a view illustrating the structure of the equipment used for the coprecipitation method of the present invention.

In the equipment shown in FIG. 2, a mixed solution is introduced from a supply inlet 2 using a pump 1 to a reaction vessel 3. The mixed solution flowed upward from the lower part of the reaction vessel 3 is allowed to have a collision with falling crystals by coprecipitation. A collecting vessel 4 for the crystals obtained is provided in the lower part of the equipment. Accordingly, the crystal particles which grow to some extent and increase their specific gravity precipitate out to reach the collecting vessel 4 placed in the lower part, but ungrown crystal particles do not reach the collecting vessel 4 because they are pushed upwards by the force of the solution flown from the lower part.

The use of the equipment described above can give a high-density composite hydroxide or composite oxide with a large particle size of 10 to 20 μm and a tap density of 2.2 g/cm$^3$. Examples of the raw materials include nickel sulfate, manganese sulfate and cobalt sulfate. The present inventors fed a mixed solution of a 1.2 mol/liter $NiSo_4$ aqueous solution, a 1.2 mol/liter $MnSo_4$ aqueous solution and a 1.2 mol/liter $CoSo_4$ aqueous solution, a 4.8 mol/liter NaOH aqueous solution and a 4.8 mol/liter $NH_3$ solution simultaneously into the reaction vessel at a flow rate of 0.5 milliliter/min.

Subsequently, the obtained hydroxide or oxide is mixed with lithium hydroxide or lithium carbonate as lithium source to produce a mixture, which is then baked to give the intended $Li[Li_x(Ni_PMn_QCo_R)_{1-x}]O_2$ as the positive electrode active material for a lithium secondary battery. Lithium hydroxide is preferably used as lithium source. The use of lithium carbonate was examined only to find that, although it was possible to obtain the intended single phase structure, lithium hydroxide is advantageous in terms of controlling the shape of particles and crystallinity.

When lithium hydroxide is used, first, lithium hydroxide melts at a relatively low temperature so that lithium is supplied into the particles of nickel manganese hydroxide; then, with the increase of the temperature, an oxidation reaction takes place gradually from the outer side of the particles. Therefore, it is ideal to use lithium hydroxide.

When lithium carbonate is used, on the other hand, a decarboxylation reaction, which takes place at a higher temperature as compared to the case of using lithium hydroxide, is required to occur first. Since the decarboxylation reaction and the oxidation reaction takes place almost simultaneously, lithium hydroxide is more advantageous in terms of controlling the shape of particles and crystallinitiy.

Next, the preferred baking conditions will be explained. a composite hydroxide of nickel, manganese and cobalt and lithium hydroxide are thoroughly dry mixed. It is ideal that lithium hydroxide and the hydroxide of nickel, manganese and cobalt be mixed such that the atomic numbers of Li, Ni, Mn and Co satisfy the equation: Li/(Ni+Mn+Co)=1. However, it is also possible to slightly increase or decrease each amount in order to controlling the baking temperature and the shape of the particles. For example, when baking at a high temperature, or when large primary particles which are obtained after baking are necessary, the amount of lithium is slightly increased for the mixing. In this case, fluctuations of about 3% are preferred.

In order to obtain the positive electrode active material of the present invention having a specific structure, it is ideal to satisfy the equation: Li/(Ni+Mn+Co)=1, but the ratio may be increased in order to achieve various purposes which will be described hereinafter. One example is the oxide represented by the formula (2): $Li[Li_x(Ni_{1/3}Mn_{1/3}Co_{1/3})_{1-x}]O_2$, where $0 \leq x \leq 0.3$. When the atomic number x of lithium in the oxide exceeds 0.3, not only the electric capacity as the active material decreases but also the intended active material having a layered structure cannot be synthesized. Accordingly, it is preferred to satisfy $0 \leq x \leq 0.3$, and most preferably $0.03 \leq x \leq 0.25$. The baking atmosphere may be any atmosphere as long as it is an oxidative atmosphere. A normal air atmosphere was used here.

Lithium hydroxide and the composite oxide obtained by coprecipitation were dry mixed, and the obtained mixture was quickly heated to 1000° C. and baked at that temperature for 10 hours. In order to decrease the temperature after the baking, the mixture was annealed at 700° C. for 5 hours, which was then cooled down to room temperature (not greater than 10° C./min). It is presumed that, while baking the oxide, the oxygen of the oxide tends to be depleted if the temperature exceeds 1000° C. With a view to preventing the oxygen loss, the step of annealing at 700° C. was introduced after the baking in order to regain the lost oxygen. The effect of annealing can be enhanced by blowing oxygen or the like.

Figure 3:
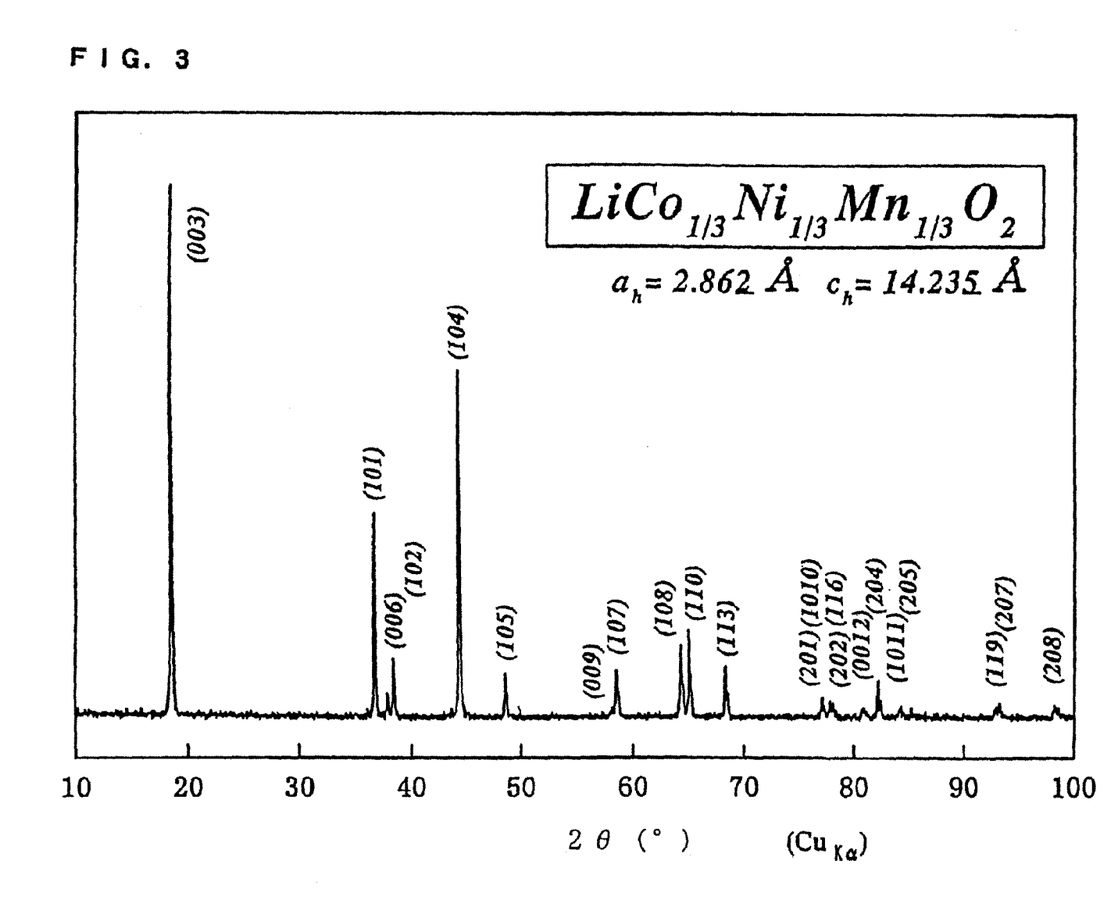
FIG. 3 is a powder X-ray diffraction pattern of positive electrode active material particles produced according to the present invention.

FIG. 3 shows the X-ray diffraction pattern of the composite oxide of nickel, manganese and cobalt thus obtained. Each peak was assigned to Miller indices as hexagonal crystal system belonging to a layered structure of R3m, and the indices are shown in the pattern. The lattice constants of a-axis and c-axis in this case are also shown in the pattern.

FIG. 3 illustrates that all peaks can be assigned and that a single phase having a layered structure is synthesized. The arrangement of oxygen and the transition metals located in 3(a) site can be confirmed by an analysis such as Rietveld method.

Although the case of using lithium hydroxide and the hydroxide obtained by coprecipitation is described here, a positive electrode active material having the similar structure is also obtained when lithium hydroxide and carbonate obtained by coprecipitation are used.

(3) Characteristics of Positive Electrode Active Material of the Present Invention Next, the electrochemical characteristics in the case of applying the obtained positive electrode active material to the coin type battery were evaluated. The coin type battery was fabricated in accordance with the following procedure.

The positive electrode active material obtained by using different temperatures, acetylene black as the electrically conductive material and a polyvinylidene fluoride resin (hereinafter referred to as "PVDF") as the binder were mixed in a weight ratio of 80:10:10, to form a molded article in the shape of sheet. The molded article was then punched in the shape of a disc and dried at a temperature of 80° C. for about 15 hours in vacuo, to give a positive electrode. On the other hand, a sheet made of lithium metal was punched in the shape of a disc to form a negative electrode. A microporous polyethylene film was used as the separator, and the electrolyte was prepared by dissolving 1 mol of $LiPF_6$ into a solvent mixture of EC (ethylene carbonate) and EMC (ethyl methyl carbonate) in a volume ratio of 1:3. Using these materials, a coin battery of 2016 size (20 mm in diameter and 1.6 mm in thickness) was fabricated by a conventional method.

Figure 4:
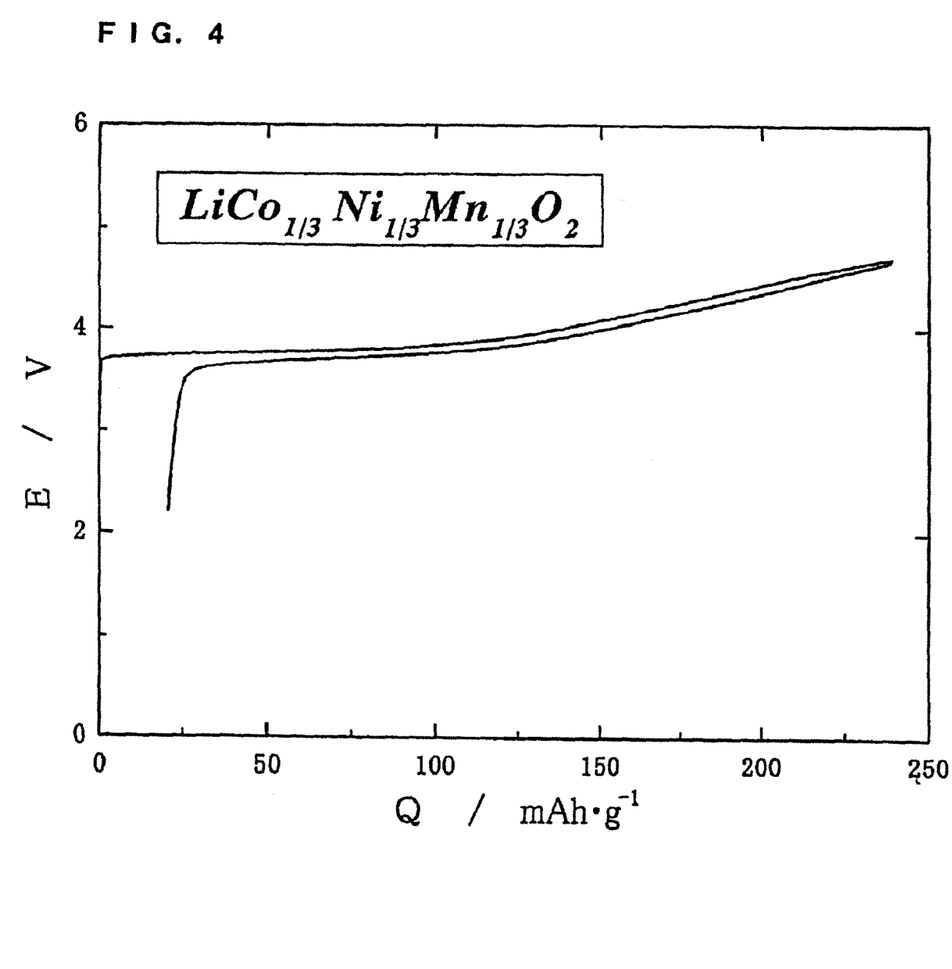
FIG. 4 is a graph showing charge/discharge curves of a coin-type battery containing a positive electrode active material formed by baking at different temperatures.

Thus fabricated coin type battery was charged and discharged at a constant current of between 3.0 and 4.7 V at a 10 hour rate. It was found that, at the initial stage, the charge/discharge capacity was about 200 mAh/g and the discharge voltage was at 4 V level. FIG. 4 shows the charge/discharge curves of this coin type battery.

As is apparent from FIG. 4, the degree of polarization due to charge/discharge is extremely small. The charge/discharge curves are almost flat in the range of 0 to 125 mAh/g, and subsequently the potential moderately increases. The discharge potential is suitable for the positive electrode active material for a 4 V level non-aqueous electrolyte battery. The charge/discharge curves like this apparently differs from the relatively steeply inclined curves of $LiMnO_2$ and $LiNiO_2$, both of which are 3 V level active materials. In addition, in terms of potential and charge/discharge curves, the positive electrode active material of the present invention differs from $LiCoO_2$. These facts prove that the positive electrode active material with a layered structure obtained by mixing three transition metals at equal ratio can represent a new function.

Then, with a view to analyze the reaction mechanism of the positive electrode active material along with charge/discharge reaction, the changes in the crystal structure of the positive electrode active material was examined. A test was conducted after the above-mentioned coin type battery was produced. The positive electrode active material was prepared by coprecipitation and baking at 1000° C.

The coin type battery was charged and discharged with some intervals, which was then disassembled to analyze the changes in the crystal structure of the positive electrode active material using an X-ray diffraction instrument. The positive electrode taken out from the coin type battery contained acetylene black as the conductive agent and PVDF as the binder. The analysis was conducted in a polyethylene bag in order to minimize the effects of disassembly and water during the measurement. The volume changes in the crystal lattice along with the charge/discharge were calculated using a lattice constant obtained from the X-ray diffraction. As a result, the charge/discharge curves of FIG. 4 indicate that the volume of the crystal lattice was almost constant (about 100 cubic Å) in the range of 0 to about 180 mAh. After that range, the volume decreased to about 95 cubic Å. The a-axis and the c-axis respectively decreased and increased, and were offset each other on a volume basis.

The phenomenon like this is of great value for the positive electrode active material. Currently, the battery system including a lithium secondary battery as the mainstream uses $LiCoO_2$ as the positive electrode active material and graphite as the negative electrode material (active material). The lattice volume of $LiCoO_2$ in the positive electrode increases along with an oxidation. The graphite also expands because Li ions are intercalated between the layers thereof. Accordingly, in this battery system, both the positive and negative electrodes expand along with the charge. This expansion is disadvantageous; to be more specific, the expansion is likely to crush the separator or to cause an internal short circuit in some cases. Additionally, in view of such expansion, some steps such as reducing the filling capacity in advance are required in some cases. Furthermore, in the application to a thin battery, the battery itself expands, thus eliminating the advantage for a thin battery.

If an active material whose lattice volume decreases by an oxidation can be used, however, the expansion of the negative electrode can be absorbed to some extent, thus solving the disadvantage of the battery expansion. Accordingly, unlike the positive electrode active material which expands by charging such as $LiCoO_2$, the positive electrode active material of the present invention whose volume is constant or decreases even by charging is of great value, particularly when a material which expands by charging such as graphite is used for the negative electrode. The behavior regarding the volume is also due to the effect that three elements of substantially equal ratio, particularly nickel, manganese and cobalt are regularly arranged to form the superlattice.

While the present inventors were working on the study, sometimes the composition ratio of nickel, manganese and cobalt was slightly changed because of various factors. Compared to the battery characteristics obtained by using the positive electrode active materials having various composition ratios, the positive electrode active material with nickel, manganese and cobalt at a ratio of nearly 1:1:1 exhibited good battery characteristics. When the error range of the composition ratio was within about 10%, the effect of the present invention was not impaired.

It has been determined, in the present invention, that the oxide obtained by substantially intermixing nickel, manganese and cobalt at equal ratio represents a new function, but it is easily conceivable to obtain an added value by further adding a new different element (added element or dopant) to the above-mentioned oxide.

Therefore, what is important is that the positive electrode active material of the present invention contains three transition metals substantially at equal ratio, and other new different element may be contained as long as most crystal particles of the oxide have the aforesaid crystal structure and its function is not impaired. Particularly, since the crystal particle is in the form of grain, it is practical to include such added element in the vicinity of the surface thereof. All variations such as the positive electrode active material having an additional function by such added element are intended to be within the scope of the present invention.

Examples of the different element include aluminum, magnesium, calcium, strontium, yttrium and ytterbium.

Doping with aluminum slightly increases the potential of the positive electrode active material and, at the same time, improves the thermal stability. In this case, the aforementioned eutectic oxide of nickel, manganese and cobalt obtained by coprecipitation is mixed with lithium hydroxide, which is then baked, and at this stage, a proper amount of aluminum source such as aluminum hydroxide is simultaneously added thereto. Thereby, aluminum is not evenly absorbed into the eutectic oxide particle; hence, the aluminum concentration in the vicinity of the surface of the particles becomes high.

This can be confirmed by a characteristic X-ray analysis and the like. Accordingly, doping enables the parent material of the crystal particles constituting the positive electrode active material to maintain the effect of the superlattice of nickel, manganese and cobalt; thereby, only the state of the surface of the crystal particles changes, as a result, the aforesaid effect can be added.

It is effective to add aluminum somewhat unevenly on the surface because the effect of the superlattice decreases as the added amount of aluminum increases. Strontium, yttrium and the like can also add the effect of improving the heat resistance.

The addition of magnesium can increase the electronic conductivity of the positive electrode active material by one or two digits. Similar to the above, magnesium hydroxide is mixed with the eutectic oxide of nickel, manganese and cobalt, and lithium hydroxide, and then the resultant mixture is baked. The baking is performed according to the method describe above. When thus-obtained positive electrode active material is applied to a battery, the amount of the electrically conductive material can be reduced because the electronic conductivity is extremely high; thus, the increase in capacity and the like can be expected.

The added amount of these different elements is effectively within the range of 0.05 to 20 atom % of the total amount of the three transition metals. If the amount is less than 0.05 atom %, the sufficient effect cannot be obtained; on the contrary, if it is over 20 atom %, a disadvantage such as the decrease in capacity arises.

(4) Non-Aqueous Electrolyte Secondary Battery

In the following, a description will be given of other constituent materials that can be used when fabricating a non-aqueous electrolyte (lithium) secondary battery using the positive electrode active material of the present invention.

The electrically conductive material used in the positive electrode material mixture for the production of the positive electrode of the present invention is not limited to a particular material, but any electronically conductive material can be used as long as the material does not cause any chemical change in the fabricated battery. Examples include: graphites such as natural graphite (scale graphite and the like) and artificial graphite; carbon blacks such as acetylene black, Ketjen black, channel black, furnace black, lamp black and thermal black; electrically conductive fibers such as carbon fiber and metallic fiber; metallic powders such as carbon fluoride powder, copper powder, nickel powder, aluminum powder and silver powder; electrically conductive whiskers such as zinc oxide whisker and potassium titanate whisker; electrically conductive metal oxides such as titanium oxide; and electrically conductive organic materials such as polyphenylene derivatives. These materials can be used alone or in any combination thereof within the scope that does not impair the effect of the present invention.

Among them, artificial graphite, acetylene black and nickel powder are particularly preferable. The amount of the electrically conductive material to be added is not particularly specified, but from 1 to 50 wt % is preferable, and most preferably from 1 to 30 wt %. In the case of carbon and graphite, from 2 to 15 wt % is particularly preferable.

The preferred binder used in the positive electrode material mixture of the present invention is a polymer having a decomposition temperature of 300° C. or higher. Examples include polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer. These materials can be used alone or in any combination thereof within the scope that does not impair the effect of the present invention.

Among them, polyvinylidene fluoride (PVDF) and polytetrafluoroethylene (PTFE) are most preferable.

As the current collector for the positive electrode, any electronic conductor can be used as long as the conductor does not cause any chemical change in the fabricated battery. Examples of the material, which constitute the current collector, include stainless steel, nickel, aluminum, titanium, various alloys or carbons, as well as a composite material such as aluminum or stainless steel with the surface thereof treated with carbon, nickel, titanium or silver.

Among them, aluminum or an aluminum alloy is preferable. The surface of these materials may be treated with oxidization. Alternatively, the surface of the current collector may be roughened by surface treatment. As for the current collector shape, any shape commonly employed in the field of batteries can be used. Examples of the shape include a foil, a film, a sheet and a net, a punched sheet, a lath body, a porous body, a foamed body, fibers and a non-woven fabric. The thickness is not particularly specified, but the thickness of from 1 to 500 μm is preferable.

As the negative electrode material used in the present invention, any compound can be used as long as the compound absorb and desorb lithium ions; examples include lithium, lithium alloy, alloy, intermetallic compounds, carbon, organic compounds, inorganic compounds, metal complexes and organic polymer compounds. These materials can be used alone or in any combination thereof within the scope that does not impair the effect of the present invention.

Examples of the lithium alloys include Li—Al based alloys, Li—Al—Mn based alloys, Li—Al—Mg based alloys, Li—Al—Sn based alloys, Li—Al—In based alloys, Li—Al—Cd based alloys, Li—Al—Te based alloys, Li—Ga based alloys, Li—Cd based alloys, Li—In based alloys, Li—Pb based alloys, Li—Bi based alloys, Li—Mg based alloys. In this case, the lithium content is preferably 10 wt % or higher.

As the alloy and intermetallic compounds, there are a compound of a transition metal and silicon, a compound of a transition metal and tin and the like. Particularly, a compound of nickel and silicon is preferred.

As the carbonaceous materials, there are coke, pyrolytic carbon, natural graphite, artificial graphite, mesocarbon microbeads, graphite mesophase particles, gas phase grown carbon, vitrified carbons, carbon fiber (polyacrylonitrile type, pitch type, cellulose type and gas phase grown carbon), amorphous carbon and carbons obtained by baking organic materials. These materials can be used alone or in any arbitrary combination thereof within the scope that does not impair the effect of the present invention. Among them, graphite materials such as graphite mesophase particles, natural graphite, and artificial graphite are preferable.

It is to be noted that the carbonaceous material may contain, in addition to carbon, a different element or a compound such as O, B, P, N, S, SiC and $B_4C$. The content thereof is preferably from 0 to 10 wt %.

As the inorganic compound, there are a tin compound and a silicon compound, and as the inorganic oxide, there are titanium oxide, tungsten oxide, molybdenum oxide, niobium oxide, vanadium oxide and iron oxide.

As the inorganic chalcogenide, there are, for example, iron sulfide, molybdenum sulfide and titanium sulfide.

As the organic polymer compound, there are, for example, polymer compound such as polythiophene and polyacetylene, and as the nitride, there are, for example, cobalt nitride, copper nitride, nickel nitride, iron nitride and manganese nitride.

These negative electrode materials may be used in combination; for example, a combination of carbon and an alloy or a combination of carbon and an inorganic compound is possible.

The average particle size of the carbon material used in the present invention is preferably from 0.1 to 60 μm, and more preferably from 0.5 to 30 μm. The specific surface is preferably from 1 to 10 $m^2/g$. In terms of crystal structure, graphite having a hexagonal lattice spacing ($d_{002}$) of carbon is from 3.35 to 3.40 Å and a size (LC) of the crystalline in the c-axis direction of 100 Å or larger, is preferable.

In the present invention, since the positive electrode active material includes Li, a negative electrode material (carbon or the like) that does not include Li can be used. However, it is preferred to add a small amount of Li (about 0.01 to 10 parts by weight per 100 parts by weight of the negative electrode material) into such a negative electrode material with no Li, because if part of Li becomes inactive by reacting with the electrolyte, for example, it can be supplemented with the Li added in the negative electrode material.

In order to add Li into the negative electrode material described above, for instance, melt lithium metal obtained by heating is applied onto the negative electrode material attached to the current collector; alternatively, lithium metal is attached to the electrode group by pressing in advance and Li is electrochemically added into the negative electrode material.

Similar to the case of the electrically conductive material used in the positive electrode material mixture, the electrically conductive material used in the negative electrode material mixture is not limited to a particular material, and any electronically conductive material can be used as long as the material does not cause any chemical change in the fabricated battery. When the carbonaceous material is used as the negative electrode material, it is unnecessary to add the electrically conductive material thereto because the carbonaceous material itself has electronic conductivity.

As the binder used in the negative electrode material mixture, either a thermoplastic resin or a thermosetting resin can be used, and the preferred binder is a polymer having a decomposition temperature of 300° C. or higher.

Examples of the binder include polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer and vinylidene fluoride-perfluoromethyl vinyl ether-tetrafluoroethylene copolymer. Among them, styrene-butadiene rubber and polyvinylidene fluoride are preferred, and most preferably styrene-butadiene rubber.

The material of the current collector for the negative electrode is not limited to a particular material, and any electronic conductor can be used as long as the conductor does not cause any chemical change in the fabricated battery. As the material constituting the current collector, examples include stainless steel, nickel, copper, titanium, and carbon, as well as a material such as copper or stainless steel with the surface treated with carbon, nickel, titanium or silver, or an Al—Cd alloy. Among them, copper or a copper alloy is preferred. The surface of these materials may be treated with oxidization. Alternatively, the surface of the collector may be roughened to form convex and concave by surface treatment.

As for the current collector shape, a foil, a film, a sheet, a net, a punched sheet, a lath body, a porous body, a foamed body, or fiber molding can be used, as in the case for the above positive electrode. The thickness is not particularly specified, but the thickness between 1 µm and 500 µm is preferable.

In addition to the electrically conductive material and the binder, a filler, a dispersing agent, an ion conducting material, a pressure reinforcing agent, and other various additives may be added into the electrode material mixture. Any fibrous material can be used for the filler as long as it does not cause any chemical change in the fabricated battery. Usually, an olefin polymer fiber such as polypropylene or polyethylene, a glass fiber or a carbon fiber is used. The amount of the filler to be added is not particularly specified, but from 0 to 30 wt % is preferable.

The positive and negative electrodes used in the present invention may have, in addition to the mixture layer containing the positive electrode active material or negative electrode material, other layers such as a base coat layer intended to improve the adhesion between the current collector and the mixture layer, the electrical conductivity, the cycle characteristics, and the charge/discharge efficiency, and a protective layer intended for mechanical and chemical protection of the mixture layer. The base coat layer and the protective layer may contain a binder or electrically conductive particles or electrically non-conductive particles.

As the separator, an insulating microporous thin film having large ion permeability and a specified mechanical strength is used. Preferably, the film has the function of closing the pores and increasing the resistance at a temperature of 80° C. or higher. A sheet or non-woven fabric made of an olefin polymer such as polypropylene or polyethylene alone or in combination thereof, or made of glass fiber is used in view of the resistance thereof to an organic solvent and hydrophobicity.

It is desirable that the pore diameter of the separator be small enough to prevent the active material, the binder, the electrically conductive material and the like separated from the electrode sheet from passing through the separator; specifically, a diameter of from 0.1 to 1 µm is desirable. As for the separator thickness, a thickness of from 10 to 300 µm is usually preferable. Porosity is determined in accordance with the electron or ion permeability, the material used, the film thickness and the like, and generally a porosity of from 30 to 80% is desirable. Further, when a flame retardant or nonflammable material such as glass or metal oxide film is used, the safety of the battery is further enhanced.

The non-aqueous electrolyte used in the present invention comprises a solvent and a lithium salt dissolved in the solvent. The preferable solvent is one ester or an ester mixture. Above all, cyclic carbonates, cyclic carboxylic acid esters, non-cyclic carbonates, aliphatic carboxylic acid esters and the like are preferred. Further, solvent mixtures containing cyclic carbonates and non-cyclic carbonates, solvent mixtures containing cyclic carboxylic acid esters, and solvent mixtures containing cyclic carboxylic acid esters and cyclic carbonates are preferred.

Examples of the solvent and other solvent to be used in the present invention are described below.

As the ester used as the non-aqueous solvent, there are cyclic carbonates such as ethylene carbonate (EC), propylene carbonate (PC), butylene carbonate (BC) and vinylene carbonate (VC), non-cyclic carbonates such as dimethyl carbonate (DMC), diethyl carbonate (DEC), ethyl methyl carbonate (EMC), and dipropyl carbonate (DPC), aliphatic carboxylic acid esters such as methyl formate (MF), methyl acetate (MA), methyl propionate (MP) and ethyl propionate (MA), and cyclic carboxylic acid esters such as γ-butyrolactone (GBL).

As the cyclic carbonate, EC, PC, VC and the like are particularly preferred; as the cyclic carboxylic acid ester, GBL and the like are particularly preferred; and as the non-cyclic carbonate, DMC, DEC, EMC and the like are preferred. Further, aliphatic carboxylic acid esters may also be preferably used, if occasion demands. The amount of the aliphatic carboxylic acid ester is preferably 30% or less of the total weight of the solvent, and most preferably 20% or less.

The solvent in the electrolyte solution of the present invention may contain a well-known aprotic organic solvent, in addition to the above ester in an amount of 80% or more.

As the lithium salt dissolved in the solvent, for example, there are $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, chloroborane lithium, lithium tetraphenyl borate, and imides such as $LiN(CF_3SO_2)(C_2F_5SO_2)$, $LiN(CF_3SO_2)_2$, $LiN(C_2F_5SO_2)_2$ and $LiN(CF_3SO_2)(C_4F_9SO_2)$. These salts can be used in the electrolyte solution alone or in any combination thereof within the scope that does not impair the effect of the present invention. Among them, it is particularly preferable to add $LiPF_6$.

For the non-aqueous electrolyte solution used in the present invention, an electrolyte solution containing at least ethylene carbonate and ethyl methyl carbonate, and containing $LiPF_6$ as a lithium salt, is particularly preferable. An electrolyte containing GBL as the main solvent is also preferred, and in this case, it is preferable to add an additive such as VC in an amount of several %, and to use a salt mixture of $LiBF_4$ and $LiN(C_2F_5SO_2)_2$ as the lithium salt instead of $LiPF_6$.

The amount of the electrolyte used in the battery is not particularly specified, but a suitable amount should be used according to the amounts of the positive electrode active material and the negative electrode material and the size of the battery. The amount of the lithium salt to be dissolved in the non-aqueous solvent is not particularly specified, but the preferred amount is 0.2 to 2 mol/l, and most preferably from 0.5 to 1.5 mol/l.

This electrolyte solution is usually impregnated or filled into the separator comprising, for example, a porous polymer, glass filter, or non-woven fabric before use.

In order to make the electrolyte solution nonflammable, a halogen-containing solvent such as carbon tetrachloride or chlorotrifluoroethylene may be added into the electrolyte solution. Also, carbon dioxide gas may be added into the electrolyte solution in order to confer suitability for high temperature storage.

Instead of the liquid electrolyte, the following solid electrolyte can also be used. The solid electrolyte is classified into inorganic or organic solid electrolyte.

As the inorganic solid electrolyte, nitrides of Li, halides of Li, and oxysalt of Li are well known. Among them, $Li_4SiO_4$, $Li_4SiO_4$—LiI—LiOH, $xLi_3PO_4$-(1–x)$Li_4SiO_4$, $Li_2SiS_3$, $Li_3PO_4$—$Li_2S$—$SiS_2$ and phosphorus sulfide compound are effectively used.

As the organic solid electrolyte, on the other hand, polymer materials such as polyethylene oxide, polypropylene oxide, polyphosphazone, polyaziridine, polyethylene sulfide, polyvinyl alcohol, polyvinylidene fluoride, polyhexafluoropropylene, and the derivative, the mixture and the complex thereof are effectively used.

It is also possible to use a gel electrolyte formed by impregnating the organic solid electrolyte with the above non-aqueous liquid electrolyte. As the organic solid electrolyte, polymer matrix materials such as polyethylene oxide, polypropylene oxide, polyphosphazone, polyaziridine, polyethylene sulfide, polyvinyl alcohol, polyvinylidene fluoride, polyhexafluoropropylene, and the derivatives, the mixtures and the complexes thereof, are effectively used. In particular, a copolymer of vinylidene fluoride and hexafluoropropylene and a mixture of polyvinylidene fluoride and polyethylene oxide are preferable.

As for the shape of the battery, any type such as coin type, button type, sheet type, cylindrical type, flat type and rectangular type can be used. In the case of a coin or button type battery, the positive electrode active material mixture and negative electrode active material mixture are compressed into the shape of a pellet for use. The thickness and diameter of the pellet should be determined according to the size of the battery.

In the case of a sheet, cylindrical or rectangular type battery, the material mixture containing the positive electrode active material or the negative electrode material is usually applied (for coating) onto the current collector, and dried and compressed for use. A well-known applying method can be used such as a reverse roll method, direct roll method, blade method, knife method, extrusion method, curtain method, gravure method, bar method, casting method, dip method, and squeeze method. Among them, the blade method, knife method, and extrusion method are preferred.

The application is conducted preferably at a rate of from 0.1 to 100 m/min. By selecting the appropriate applying method according to the solution properties and drying characteristics of the mixture, an applied layer with good surface condition can be obtained. The application of the material mixture to the current collector can be conducted on one side of the current collector, or on the both sides thereof at the same time. The applied layers are preferably formed on both sides of the current collector, and the applied layer on one side may be constructed from a plurality of layers including a mixture layer. The mixture layer contains a binder and an electrically conductive material, in addition to the material responsible for the absorbing and desorbing lithium ions, like the positive electrode active material or negative electrode material. In addition to the mixture layer, a layer containing no active material such as a protective layer, a base coat layer formed on the current collector, and an intermediate layer formed between the mixture layers may be provided. It is preferred that these layers having no active material contain electrically conductive particles, insulating particles, a binder and the like.

The application may be performed continuously or intermittently or in such a manner as to form stripes. The thickness, length, and width of the applied layer is determined according to the size of the battery, but the thickness of one face of the applied layer which is dried and compressed is preferably 1 to 2000 μm.

As the method for drying or dehydrating the pellet and sheet of the material mixture, any conventional method can be used. In particular, the preferred methods are heated air, vacuum, infrared radiation, far infrared radiation, electron beam radiation and low humidity air, and they can be used alone or in any combination thereof.

The preferred temperature is in the range of 80 to 350° C., and most preferably 100 to 250° C. The water content of the battery as a whole is preferably 2000 ppm or less, and the water content for the positive electrode material mixture, negative electrode material mixture and electrolyte is preferably 500 ppm or less in view of the cycle characteristics.

For the sheet pressing method, any conventional method can be used, but a mold pressing method or a calender pressing method is particularly preferred. The pressure for use is not particularly specified, but from 0.2 to 3 $t/cm^2$ is preferable. In the case of the calender pressing method, a press speed is preferably from 0.1 to 50 m/min.

The pressing temperature is preferably between room temperature and 200° C. The ratio of the width of the positive electrode sheet to that of the negative electrode sheet is preferably at 0.9 to 1.1, and more preferably at 0.95 to 1.0. The content ratio of the positive electrode active material to the negative electrode material cannot be specified because it differs according to the kind of the compound used and the formulation of the mixture, but those skilled in the art would set an optimum value considering the capacity, cycle characteristics and safety.

It is not necessary that the wound electrode structure in the present invention be in a true cylindrical shape; it may be in any shape such as an elliptic cylinder whose cross section is an ellipse or a rectangular column having a prismatic shape or a rectangular face.

The following will describe the present invention by using examples, but the present invention is not limited to these examples.

Example 1 and Comparative Example 1

Figure 5:
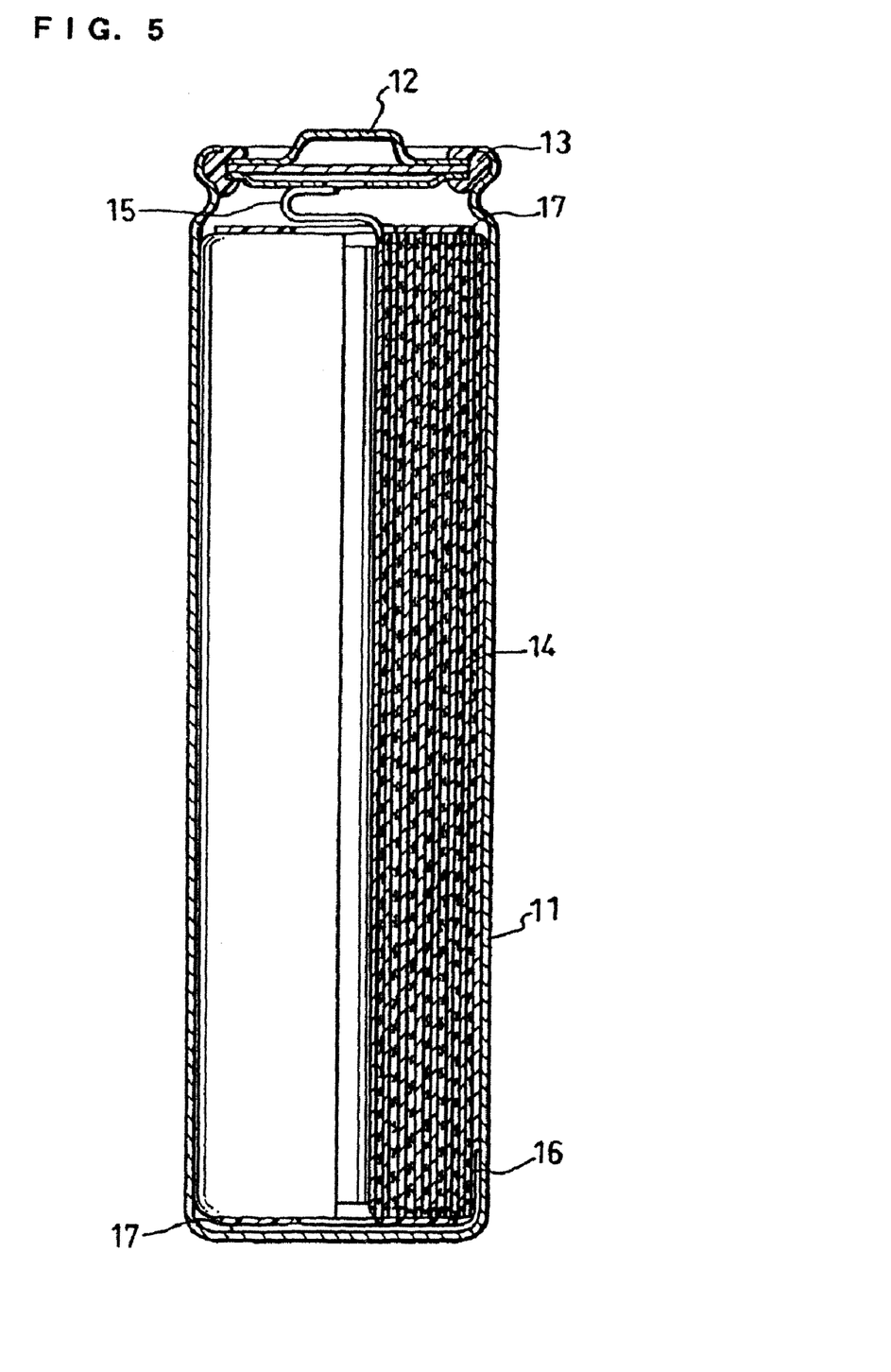
FIG. 5 is a schematic longitudinal sectional view of a cylindrical battery produced in the present example.

FIG. 5 is a schematic longitudinal sectional view of the cylindrical battery produced in this example.

An electrode assembly 14 obtained by spirally winding positive and negative electrode plates with a separator interposed therebetween is housed in a battery case 11. A positive electrode lead 15 attached to the positive electrode plate is connected to a sealing plate 12, and a negative electrode lead 16 attached to the negative electrode plate is connected to the bottom of the battery case 11. The battery case and the lead plate can be formed using a metal or alloy with electronic conductivity and chemical resistance to organic electrolyte. For example, a metal such as iron, nickel, titanium, chromium, molybdenum, copper, aluminum, or an alloy made of these metals can be used. In particular, it is most preferable to use a stainless steel plate or a processed Al—Mn alloy plate for the battery case, aluminum for the positive electrode lead, and nickel for the negative electrode lead. It is also possible to use various engineering plastics or the combination of the engineering plastic and the metal for the battery case in order to reduce the weight of the battery.

Insulating rings 17 are respectively provided on both top and bottom of the electrode assembly 14. Subsequently, an electrolyte is charged thereinto, and the battery case is sealed by using the sealing plate. Here, the sealing plate can be provided with a safety valve. Instead of the safety valve, it may be provided with a conventional safety device. For instance, as an overcurrent-preventing device, fuse, bimetal, PTC device or the like is used. Besides a safety valve, as a method for preventing the internal pressure of the battery case from increasing, making a notch in the batterycase, cracking the gasket or the sealing plate, or cutting the lead plate can be employed. Alternatively, a protective circuit including means for preventing overcharge and overdischarge may be contained in a charger, or may be independently connected to the battery.

In order to prevent overcharge, a method to interrupt the electric current by the increase of the internal pressure of the battery can be used. In this method, a compound which increases the internal pressure can be added into the mixture or the electrolyte. For the compound which increases the internal pressure, carbonate such as $Li_2CO_3$, $LiHCO_3$, $Na_2CO_3$, $NaHCO_3$, $CaCO_3$ and $MgCO_3$ can be used. As the method for welding the cap, the battery case, the sheet and the lead plate, any well-known method (i.e. AC or DC electric welding, laser welding or ultrasonic welding) can be used.

For the sealing agent for sealing, a conventional compound such as asphalt or mixture can be used.

The positive electrode plate was fabricated as follows. 10 parts by weight of carbon powder as the electrically conductive material and 5 parts by weight of poly vinylidene fluoride resin as the binder were mixed with 85 parts by weight of the positive electrode active material powder of the present invention. The resultant mixture was dispersed in dehydrated N-methyl pyrrolidinone to give a slurry. The slurry was applied onto the positive electrode current collector made of aluminum foil, which was then dried, rolled out and cut into a specified size.

A carbonaceous material and styrene butadiene rubber binder were mixed at a weight ratio of 100:5 to give a mixture. The mixture was applied onto both surfaces of a copper foil, which was then dried, rolled out and cut into a specified size to give a negative electrode.

For the separator, micro porous film made of polyethylene was used. For the organic electrolyte, an organic electrolyte solution obtained by dissolving $LiPF_6$ into a solvent mixture of ethylene carbonate and ethyl methyl carbonate at a volume ratio of 1:1 at 1.5 mol/liter was used. The cylindrical battery produced had a diameter of 18 mm and a height of 650 mm. For the positive electrode active material, $Li[Li_{0.03}(Ni_{1/3}Mn_{1/3}Co_{1/3})_{0.97}]O_2$ was used.

For comparison, a cylindrical battery was produced in the same manner as above using $LiCO_2$ as the positive electrode active material. Table 1 shows the comparison result of electric characteristics between these batteries.

First, these batteries were charged at a constant current of 100 mA up to 4.2 V, and then were discharged at a constant current of 100 mA down to 2.0 V. This charge/discharge cycle was repeated several times until the battery capacity was constant; thereafter, the capacity was measured.

The conditions for measuring the capacity were as follows. The charge was a constant voltage charge with 4.2 V, and the maximum current was 1 A. The charging was stopped when the current value reached 50 mA. The discharge was a constant voltage discharge with 300 mA, and was performed down to 2.5 V. The discharge capacity obtained here is referred to as battery discharge capacity. The atmosphere during the charge/discharge was 25° C.

With regard to high rate discharge ratio, the discharge capacities of the batteries were respectively measured when discharged at a 5 hour rate (at a current of 0.2 C) and when discharged at 0.5 hour rate (at a current of 2 C) in the case of the battery capacity being 1 C; thereafter, the measured values were represented by the capacity ratio of (discharge capacity at 0.2 C)/(discharge capacity at 2 C). Regarding the discharge ratio at low temperature, the discharge capacities were measured when discharged at a current of 1 C under an atmosphere of 20° C. and when discharged under an atmosphere of −10° C., and the obtained values were represented by the discharge capacity ratio of (discharge capacity at −10° C.)/(discharge capacity at 20° C.). The cycle life was represented by the ratio of the capacity at 100 cycles to the initial capacity.

TABLE 1

| | Positive electrode active material | Capacity (mAH) | High rate discharge rate (%) | Discharge rate at low temperature (%) | Cycle life |
|---|---|---|---|---|---|
| Ex. 1 | $Li[Li_{0.03}(Ni_{1/3}Mn_{1/3}Co_{1/3})_{0.97}]O_2$ | 1880 | 97 | 72 | 90 |
| Comp. Ex. | $LiCoO_2$ | 1800 | 95 | 50 | 84 |

Table 1 illustrates that the battery of the present invention excels in every tested matter. Therefore, the application of the positive electrode active material of the present invention to a lithium secondary battery provides a more excellent battery than that using conventional $LiCoO_2$.

Example 2

Stability of Material

After Li leaves $LiNiO_2$ by charging, $LiNiO_2$ becomes extremely unstable and is reduced to NiO by releasing oxygen at a relatively low temperature. This is fatal when it is used for the positive electrode active material for a battery, and this would cause a thermal runaway of the battery due to the generated oxygen, leading to ignition or rupture of the battery.

Such disadvantage was able to be overcome by using the oxide obtained by incorporating nickel, manganese and cobalt at a ratio of 1:1:1. Furthermore, doping the vicinity of the surface of the positive electrode active material with aluminum improved the heat resistance. The battery using the positive electrode active material obtained by doping $LiNi_{1/3}Mn_{1/3}Co_{1/3}O_2$ with aluminum was put through the following test. The amount of aluminum was 5 atom % of the total amount of nickel, manganese and cobalt. The battery used in Example 1 was overcharged up to 4.8 V, which was then disassembled and the positive electrode material mixture was taken out therefrom. The positive electrode material mixture was subjected to a DSC (differential scanning calorimetry) measurement. Table 2 shows the exothermic peaks observed at the lowest temperatures in the DSC measurement.

TABLE 2

| | Positive electrode active material | 1st peak temperature in DSC measurement |
|---|---|---|
| Ex. 1 | $Li[Li_{0.03}(Ni_{1/3}Mn_{1/3}Co_{1/3})_{0.97}]O_2$ | 198 |
| Ex. 2 | 2 atom % of aluminum added | 205 |
| Comp. Ex. | $LiCoO_2$ | 118 |

Table 2 illustrates that the exothermic temperatures of batteries of Examples 1 and 2 are higher than that of $LiCoO_2$. The reason is as follows. In the case of $LiCoO_2$, the whole lattice of $LiCoO_2$ expands by overcharging. This makes the crystal structure unstable and oxygen is easily released. By increasing the temperature at this state, the exothermic reaction presumably due to the released oxygen is observed.

In the case of the material of Example 1 of the present invention, on the other hand, it is surmised that the lattice expansion is restrained; hence, the oxygen release is suppressed. Moreover, when aluminum is added thereto, the effect enhances and the temperature largely increases, which proves that the thermal stability of the positive electrode active material greatly improves.

A study was made on the added amount of aluminum; a preferable result was obtained in the range of 0.05 to 20 atom % of the total amount of the transition metal elements. When the amount was less than 0.05 atom %, the sufficient effect was unable to be obtained, whereas when it was over 20 atom %, the capacity decreased.

Example 3

Electronic Conductivity of Material

The doping of $LiNi_{1/3}Mn_{1/3}Co_{1/3}O_2$ of the present invention with a different element represents an added function; moreover, the addition of magnesium thereto greatly improves the electronic conductivity. This can reduce the amount of the electrically conductive material to be added into the positive electrode plate; thus, more active material can be filled therein, resulting in the increase of the capacity.

In this example, 10 parts by weight of carbon powder as the electrically conductive material and 5 parts by weight of poly vinylidene fluoride resin as the binder were mixed with 85 parts by weight of the positive electrode active material powder. Electronic conductivity was measured for thus obtained electrode plate. In the measurement, a resistance value in the cross sectional direction of the electrode plate was measured, and the obtained value was converted to the electronic conductivity per cross-sectional area. Table 3 shows the result obtained from the measurement, which is represented by the ratio when the electronic conductivity of the electrode plate using $LiNi_{1/3}Mn_{1/3}Co_{1/3}O_2$ is set to 100.

Electronic conductivity was measured for each electrode plate containing the magnesium added positive electrode active material and different added amounts of the electrically conductive material. The positive electrode active material was obtained by baking the mixture of the eutectic oxide of nickel, manganese and cobalt and lithium hydroxide, and a proper amount of magnesium hydroxide was added thereto before baking. The added amount of magnesium was 2 atom %.

TABLE 3

| | Positive electrode active material | Added amount of electrically conductive material (wt %) | Electronic conductivity (ratio) |
|---|---|---|---|
| Ex. 1 | $LiNi_{1/3}Mn_{1/3}Co_{1/3}O_2$ | 5 | 100 |
| Ex. 3 | 2 atom % of magnesium added | 1 | 86 |
| | 2 atom % of magnesium added | 2 | 100 |
| | 2 atom % of magnesium added | 5 | 105 |
| Comp. Ex. | $LiCoO_2$ | 5 | 98 |

Table 3 illustrates that the electrode plate containing the magnesium added positive electrode active material and 2 wt % of the electrically conductive material exhibits the same electronic conductivity as the conventional electrode plate with 5 wt % of the electrically conductive material. Regarding the added amount, a similar tendency was observed as in the case of aluminum, but if the added amount is increased, undoped magnesium will be detected as an impurity; therefore, the amount is preferably 0.05 to 10 atom %.

It is to be understood that, although the examples used a carbonaceous material as the negative electrode active material in order to evaluate the performance of the positive electrode, the negative electrode active material is not limited to this and an alloy, a lithium metal, other oxide with a relatively low potential, nitride or the like can also be used. Regarding the electrolyte, it is also to be understood that the examples used the electrolyte obtained by dissolving $LiPF_6$ into the solvent mixture of ethylene carbonate and ethyl methyl carbonate at a volume ratio of 1:1 at 1.5 mol/liter, but the electrolyte is not limited to this and an organic or inorganic solid-electrolyte can also be used.

INDUSTRIAL APPLICABILITY

According to the present invention, it is possible to efficiently use an inexpensive composite oxide of nickel, manganese and cobalt as the positive electrode active material, and to provide a high-capacity non-aqueous electrolyte secondary battery with excellent charge/discharge efficiency.

The invention claimed is:

1. A positive electrode active material comprising crystal particles of a lithium transition metal oxide,
    said lithium transition metal oxide containing three different transition metal elements in equal amounts and having a layered crystal structure,
    wherein said layered crystal structure of said oxide is an R3m layered structure,
    said three different transition metal elements are nickel, cobalt, and manganese,
    the arrangement of oxygen atoms constituting said oxide is a cubic close-packed structure,
    said three transition metal elements constitute a superlattice of [√3×√3] R30°, and
    said three transition metal elements are regularly arranged in the 3(a) site of the R3m layered structure.

2. The positive electrode active material in accordance with claim 1, comprising a mixture of said crystal particles of said oxide with a particle size of 0.1 to 2 μm and secondary particles with a particle size of 2 to 20 μm.

3. The positive electrode active material in accordance with claim 1, wherein the volume of a unit lattice of said crystal particles does not increase upon oxidation.

4. A positive electrode active material comprising crystal particles of a lithium transition metal oxide,
    said lithium transition metal oxide containing three different transition metal elements in equal amounts and having a layered crystal structure,
    wherein the three transition metal elements constitute a superlattice of [√3×√3] R30°,
    the surface of said crystal particles is doped with at least one element different from said three different transition elements,
    wherein said layered crystal structure of said oxide is an R3m layered structure,
    said three different transition metal elements are nickel, cobalt, and manganese,
    the arrangement of oxygen atoms constituting said oxide is a cubic close-packed structure,
    said three transition metal elements are regularly arranged in the 3(a) site of the R3m layered structure in said crystal particles except said surface doped with said at least one different element,
    said at least one different element is selected from the group consisting of aluminum, magnesium, calcium, strontium, yttrium, and ytterbium, and
    the amount of said at least one different element is 0.05 to 20 atom % of the total amount of said three different transition metal elements.

* * * * *